Nov. 16, 1965   K. C. ALLEN   3,217,819

COMPUTING SCALE

Filed June 6, 1963

INVENTOR.
KENNETH C. ALLEN
BY
*Marechal, Biebel, French & Bugg*
ATTORNEYS

United States Patent Office

3,217,819
Patented Nov. 16, 1965

3,217,819
COMPUTING SCALE
Kenneth C. Allen, Dayton, Ohio, assignor to The Hobart Manufacturing Company, Troy, Ohio, a corporation of Ohio
Filed June 6, 1963, Ser. No. 285,925
3 Claims. (Cl. 177—177)

This invention relates to computing scales, and particularly to scales of the type provided with a drum chart arranged within a housing for reading through a relatively long and narrow window and lens.

Scales of the above type, one example of which is shown in the patent to David A. Meeker et al. 2,649,293, issued August 18, 1953, commonly employ a light source within the scale housing positioned to illuminate the elongated fragment of the chart which is aligned with the reading window and lens. If this light source provided the only available light, reading of the chart would be easy, but in ordinary use, such a scale is located in a market or other store having multiple overhead light sources for purposes of general illumination, and these other light sources often interfere with proper reading of the scale.

More particularly, while some of the light emanating from within the room does aid in illuminating the scale chart, a large portion of this light is reflected from both the front and back surfaces of the lens without reaching the chart. This other light, which is specularly reflected, constitutes glare and tends to obscure the indicia on the chart. Furthermore, since the lens commonly has a convexly curved front surface, this increases the angular field through which reflected images of outside light sources are visible to the user, thus further contributing to the difficulty of reading the chart.

It is the principal object of the present invention to provide a computing scale of the type outlined above which is constructed for maximum ease of reading with minimum interference by reflected light emanating from sources within the room where the scale is used.

A specific object of the invention is to provide a scale having the characteristics outlined above which is equipped with a hood or shield mounted on the scale housing in such relation with the chart window, the reading lens and the observer's eye that it blocks a major portion of the light emanating from outside the housing which would otherwise be reflected from the lens toward the eye of the user.

A further object of the invention is to provide a computing scale as outlined in the preceding paragraph wherein the shield for the lens comprises a sheet of transparent material positioned to reflect away from the eye of the user light emanating from within the room which would otherwise tend to be reflected from the lens, and particularly to provide such a sheet which also absorbs some of the light which passes therethrough toward the lens.

It is also an object of the invention to provide a scale of the general characteristics outlined above wherein the chart is illuminated from within the scale housing by light of a predetermined limited wave length band and wherein the shield for the lens includes a sheet of transparent material having maximum light transmitting properties for such predetermined wave length band and substantially absorbs visible light of other wave lengths.

Other objects and advantages of the invention will be apparent from the following description, the accompanying drawing and the appended claims.

Figure 1:
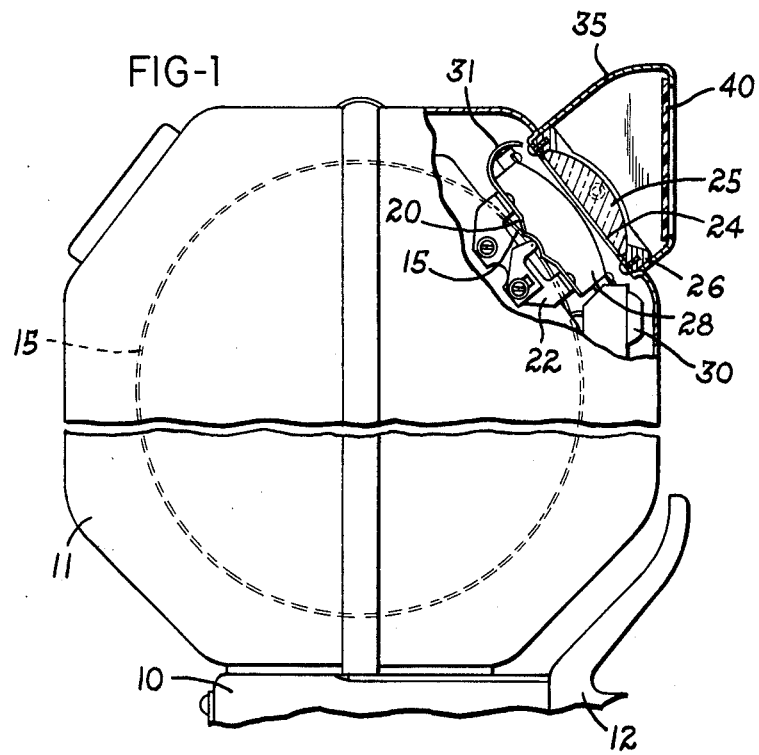
FIG. 1 is a partial side view partly in elevation and partly broken away in section of a scale incorporating the features of this invention.
Figure 2:
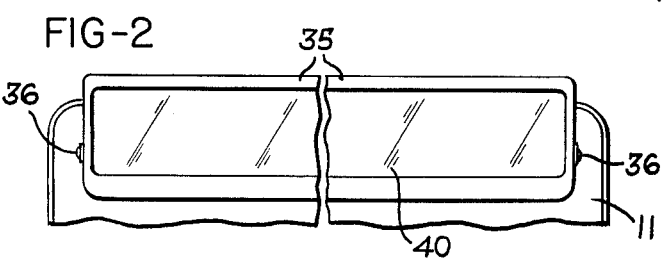
FIG. 2 is an enlarged partial front elevation of the scale of FIG. 1 showing the hood assembly shielding the chart window and lens.
Figure 3:
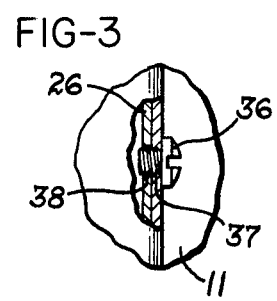
FIG. 3 is an enlarged fragment of FIG. 2, partly broken away.

Referring to the drawing, which illustrates a preferred embodiment of the invention, FIG. 1 shows a scale generally of the construction shown in the above Meeker at al. patent and comprising a base 10 supporting a housing 11 and a weight receiving platter 12. Suitable mechanism such as shown in the Meeker et al. patent links the platter 12 with a drum chart 15 within the housing 11 to provide for rotation of the chart about its longitudinal axis in proportion to weight applied to the platter.

The chart 15 carries upon its outer surface the usual indicia including weight and price designations arranged in parallel columns for cooperation with unit price designations carried upon a stationary price face 20 for computing the price of the weighed articles corresponding to the weight and unit price. Frame means such as bracket members 22 are mounted within the housing at opposite ends of the chart 15 to support the price face 20 across and spaced from the surface of the chart.

The housing 11 is provided with an elongated window opening 24 aligned with the price face 20 and the fragment of chart below the price face, and this window opening is located in an inclined section of the housing 11 such that the normal viewing path therethrough is at an angle of the order of 45° to the vertical. A cylindrical lens 25 is mounted in this window opening 20 by means of an annular frame 26 to magnify the indicia on the price face and the chart for reading purposes, and the flat inner surface of lens 25 similarly extends at approximately 45° to the vertical. FIG. 1 also shows an auxiliary or booster lens assembly 28 which is mounted above one end portion of the price face for further magnifying the higher and therefore smaller sized and more closely spaced graduations in accordance with Allen et al. patent 2,742,-811 issued April 24, 1956. A suitable light such as a fluorescent tube 30 is mounted in the housing below the window 24, and a light shield 31 is positioned adjacent the upper edge of the window to reflect light from the tube 30 onto the price face 20.

When a scale constructed as thus described is mounted in a market or other room having light sources adjacent the ceiling for purposes of general illumination, a large portion of the light from these exterior sources will strike the surfaces of the lens 25 at such angles that it will be specularly reflected toward the eyes of the user located in normal viewing position with respect to the scale, and this problem is particularly acute when the scale is so constructed as shown that the user's eyes are normally positioned substantially above the lens 25 and must look downwardly at the lens. This reflected light may seriously interfere with reading of the price face and the chart, and this effect is further increased in the area of the window overlying the booster lens 28. As previously pointed out, this effect is made worse with a lens 25 having a cylindrically or spherically curved convex outer surface, since this increases the angular field from which glare images of exterior light sources are produced.

In accordance with the invention, means are provided for suppressing the nondesirable reflection of exterior light, and such means include a hood 35 positioned to the extent around the lens frame 26 and to overhang the lens 25 as best seen in FIG. 1. This hood is preferably formed of metal or opaque plastic, and it is secured in position in any convenient manner as by means of a pair of screws 36 threaded through tapped holes 37 in each end of the hood 35 and with their inner ends received in bores 38 in the ends of the lens frame 26.

It will be seen that the hood 35 provides effective shielding of the lens 25 from light which would otherwise strike the lens over a substantial angular range above the scale, but it necessarily leaves the lens open from the front of the scale for viewing purposes. Additional suppression of undesired reflected light is produced in accordance with the invention by providing the shield 35 with a light screen or filter 40 mounted in a substantially vertical plane in the front of the hood 35.

The screen 40 is transparent and may be formed of glass or plastic, but for preferred results, it is of particular light transmitting properties with relation to the light from the tube 30 within the housing 11. More specifically, the tube 30 is preferably selected to emit light of a predetermined wave length band less than the whole visible spectrum, for example green light. The light screen 40 is similarly selected for maximum transmission of the light emitted by the tube 30 and maximum absorption of other visible light, so that if the tube 30 emits predominantly green light, the screen 40 should be correspondingly green.

With the particular combination of light source 30 and screen 40 as just described, it will be seen that substantially all of the light carrying an image of the price face and chart to the user will be transmitted by the screen 40. On the other hand, light emanating from within the room which would otherwise tend to enter the chart 35 and be reflected from the lens 25 will first encounter the screen 40. Some of this light will be reflected downwardly from the front surface of the screen and therefore away from the eyes of the user. The light which does pass through the screen will be reduced in intensity by reason of the adsorption of its non-green components, so that whatever light remains which may be reflected from the lens 25 will be such a small proportion that it will cause no inconvenience to the user of the scale.

Figure 4:
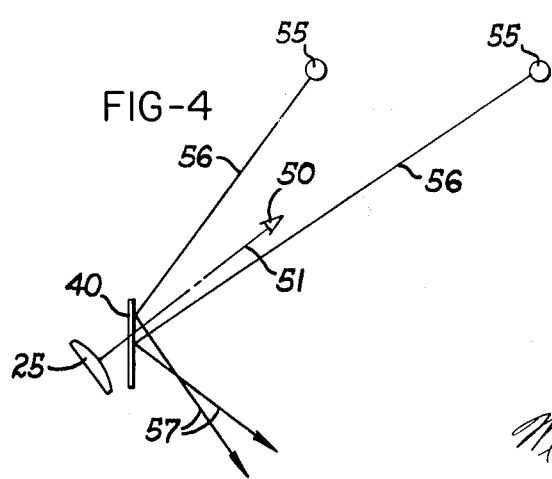
FIG. 4 is a ray diagram illustrating the operation of the scale of FIGS. 1-3.

FIG. 4 illustrates diagrammatically the operation of the invention as just described. The eye of the observer is indicated at 50 in the normal position for viewing the illustrated scale, along the normal path of view defined by the rays 51 which carry the image of the proper indicia on the chart, and with travel essentially through the center and parallel with the optical axis of the lens 25. The small circles 55 represents fluorescent tubes or other light sources which provide the overall illumination for the room in which the scales is being used.

The rays 56 in FIG. 4 which travel from the light sources 55 towards the scale would in the absence of the invention be reflected from the lens 25 toward the eye of position 50. These rays, however, first strike the outer surface of the screen 40, and a substantial proportion of the light is reflected downwardly as indicated by the ray lines 57. The relatively small proportion of the original rays 56 which passes through the screen 40 will be subject to the selective absorption already described, and there will also be outward reflection from the back surface of the screen 40, thus further reducing the amount of original light which is transmitted by the screen 40 toward the lens 25. Some of this transmitted light will be reflected from the lens 25, but this reflected light will be further reduced by two factors before it reaches the eye of the observer, one of these factors being reflection off the surfaces of the screen 40 toward the interior of the shield 35, and the other factor being further absorption by the light absorbing material of the screen 40. The reflected light which ultimately reaches the eyes of the user is therefore so small a proportion of the original rays 56 that it is effectively insignificant.

This combination of a light source 30 and screen 40 of essentially the same color provides optimum results in the practice of the invention, but it is also practicable to employ the invention with a light screen 40 of general light absorbing properties, such as a sheet of gray glass or plastic, in combination with a light source 30 emitting white light. This combination provides the same advantages of reflecting away a major part of the undesired light days from the surrounding room, and the light which is transmitted by the screen 40 toward the lens is similarly reduced in intensity by absorption both in its initial travel through the screen 40 and again after it has been reflected from the lens. As a result, the reflected light which reaches the eye of the user is so reduced in intensity in comparison with the light emanating from the source 30 that the scale is easily read.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a weighing scale of the character described having a housing, a drum chart having indicia on one surface thereof, means supporting said chart for rotation in said housing in proportion to weight applied to the scale, said housing having a narrow window in a portion thereof located intermediate the vertical and horizontal center lines thereof and extending parallel with said chart to provide for viewing of the portion of said chart aligned therewith along a normal path of view extending downwardly at an angle approximately intermediate the horizontal and vertical, a lens supported in said window for magnifying the indicia on said chart, said lens being positioned in an inclined plane substantially perpendicular to said path of view to locate the optical axis thereof substantially in said normal path of view, and a light source mounted within said housing in position to illuminate the portion of said chart aligned with said window and said lens, the combination of means for minimizing interference with viewing of said chart by light emanating from outside said housing, comprising hood means mounted on said housing and extending from behind said lens upward and forward with respect to said lens in surrounding and overhanging relation with said lens to shield said lens from the direct path of light emanating from light sources positioned at higher levels than the scale in the room wherein the scale is used, said hood means having an opening extending along the side thereof to afford direct viewing of said chart through said lens by a user along said normal path of view, and a substantially flat sheet of transparent material mounted in substantially vertical position within said opening in said hood means to reflect away from said user the light emanating from within the room and traveling toward said opening.

2. The combination defined in claim 1 wherein said sheet of transparent material is of selectively light-absorbing properties for reducing the intensity of light emanating from within the room which passes therethrough and is reflected from said lens.

3. In a weighing scale of the character described having a housing, a drum chart having indicia on one surface thereof, means supporting said chart for rotation in said housing in proportion to weight applied to the scale, said housing having a narrow window therein extending parallel with said chart and positioned to provide for viewing of the portion of said chart aligned therewith along a path of view extending downwardly at an angle approximately intermediate the horizontal and vertical, and a lens supported in said window for magnifying the indicia on said chart, said lens being positioned in an inclined plane substantially perpendicular to said path of view, the combination of means for minimizing interference with viewing of said chart by light emanating from outside said housing, comprising a light source mounted within said housing in position to illuminate the portion of said chart aligned with said window and said lens, said light source emitting light of a predetermined band of wave lengths substantially less wide than the visible spectrum, hood means mounted on said housing in covering relation with said lens to shield said lens from the direct path of light emanating from light sources positioned at higher levels than the scale in the room wherein the scale is used, said hood means having an opening extending along the side thereof to afford direct viewing of said chart through said lens by a user positioned in normal operation relation with the scale, and a substantially flat sheet of transparent material having maximum light transmitting properties for light of said selected wave length band mounted in substantially vertical position within said opening in said hood means and having substantial light absorbing properties for visible light of other wave lengths.

References Cited by the Examiner

UNITED STATES PATENTS

| | | | |
|---|---|---|---|
| 1,684,212 | 9/1928 | Berger | 88—1 |
| 1,685,790 | 10/1928 | Thomas | 88—1 |
| 1,865,326 | 6/1932 | Marshall | 88—1 |
| 1,984,561 | 12/1934 | Zinke | 177—177 |

FOREIGN PATENTS

| | | |
|---|---|---|
| 289,166 | 4/1928 | Great Britain. |
| 151,263 | 8/1955 | Sweden. |

LEO SMILOW, *Primary Examiner.*